US012810545B2

(12) United States Patent
Huang et al.

(10) Patent No.: US 12,810,545 B2
(45) Date of Patent: Nov. 24, 2026

(54) TEMPLATIZING ROAD SEGMENTS

(71) Applicant: Toyota Jidosha Kabushiki Kaisha, Toyota (JP)

(72) Inventors: Wanting Huang, Los Gatos, CA (US); Alexander Charles Granieri, Mountain View, CA (US); Vincent Sarcia Pascual, Dublin, CA (US); Jimmy Chiu, San Jose, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 131 days.

(21) Appl. No.: 18/893,300

(22) Filed: Sep. 23, 2024

(65) Prior Publication Data

US 2026/0087733 A1 Mar. 26, 2026

(51) Int. Cl.
*G06T 17/00* (2006.01)

(52) U.S. Cl.
CPC .................................... *G06T 17/00* (2013.01)

(58) Field of Classification Search
CPC .......................... G06T 17/00; G06T 2211/441
See application file for complete search history.

(56) References Cited

U.S. PATENT DOCUMENTS 9,836,895 B1 12/2017 Nygaard et al.
10,366,290 B2 7/2019 Wang et al.
11,207,598 B2 12/2021 Thomas et al.
2011/0280453 A1* 11/2011 Chen .................. G01C 21/3807 382/113
2016/0236088 A1 8/2016 Li et al.
2018/0040162 A1 2/2018 Donnelly et al.
2019/0156558 A1 5/2019 Neeter
2019/0235521 A1 8/2019 Mudalige et al.
2021/0404826 A1* 12/2021 Yu ...................... A63B 22/0605
2022/0196839 A1 6/2022 Goldstein et al.
2022/0335672 A1* 10/2022 Lee ......................... G06T 11/60
(Continued)

FOREIGN PATENT DOCUMENTS

CN 109472365 A 3/2019
WO 2017151436 A1 9/2017
WO 2023247092 A1 12/2023

OTHER PUBLICATIONS

Eramo et al., "AI-augmented Automation for Real Driving Prediction: an Industrial Use Case", arXiv:2404.02841v1, Apr. 3, 2024, 9 pages.

(Continued)

*Primary Examiner* — Phi Hoang
(74) *Attorney, Agent, or Firm* — Christopher G. Darrow; Darrow Mustafa PC

(57) ABSTRACT

Systems, methods, and other embodiments described herein relate to using sensor data of observed roadways as templates for generating virtual driving segments according to a generative model. In one embodiment, a method includes receiving a request to generate a virtual road segment. The request including parameters specifying characteristics of how to generate the virtual road segment. The method includes synthesizing the virtual road segment according to the parameters using a generative model, including stitching at least two roadway segments together using sensor data from at least one roadway. The method includes providing the virtual road segment.

17 Claims, 7 Drawing Sheets

(56) References Cited

U.S. PATENT DOCUMENTS

| | | | | |
|---|---|---|---|---|
| 2022/0340153 | A1 | 10/2022 | Weaver et al. | |
| 2023/0004801 | A1 | 1/2023 | Farabet et al. | |
| 2023/0192136 | A1 | 6/2023 | Monteith et al. | |
| 2024/0078363 | A1 | 3/2024 | Nassar et al. | |
| 2024/0125899 | A1* | 4/2024 | Khadem | G06V 20/588 |
| 2024/0391464 | A1* | 11/2024 | Cardona | G06F 18/251 |
| 2025/0046066 | A1* | 2/2025 | Park | G06V 20/70 |
| 2025/0065894 | A1* | 2/2025 | Luo | B60W 50/06 |
| 2025/0198790 | A1* | 6/2025 | Tran | G06N 20/00 |
| 2025/0368193 | A1* | 12/2025 | Maxvall | B60W 30/09 |

OTHER PUBLICATIONS

Li et al., "AADS: Augmented Autonomous Driving Simulation Using Data-Driven Algorithms", Science Robotics, Mar. 27, 2019, vol. 4, 13 pages.

* cited by examiner

TEMPLATIZING ROAD SEGMENTS

TECHNICAL FIELD

The subject matter described herein relates, in general, to generating virtual driving environments and, more particularly, to using a generative model to adapt and stitch together observed roadways into new virtual driving segments.

BACKGROUND

In recent years, the development and testing of autonomous vehicles and semi-autonomous functionality have increasingly relied upon virtual environments to simulate real-world driving conditions. Moreover, driver training and entertainment can also use virtual environments. These virtual environments are crucial for validating the performance and safety of automated driving systems before deployment on actual roads. One challenge in creating such virtual environments lies in efficiently generating realistic scenarios that accurately reflect the complexities of diverse road conditions encountered in the real world.

Traditionally, virtual environments have been created using manually designed scenarios or simplified simulations that may not fully capture the nuances of actual driving experiences. This can lead to discrepancies between virtual tests and real-world performance, potentially compromising the reliability and effectiveness of autonomous vehicle systems. Similarly, in the context of driver training and gaming, any disparities between the virtual environment and the real-world experience can leave a gap in training and/or enjoyment of the experience. As such, existing solutions present difficulties when attempting to provide a realistic virtual environment.

SUMMARY

Example systems and methods relate to using sensor data of observed roadways as templates for generating virtual driving segments according to a generative model. As previously noted, testing and training autonomous systems as well as drivers can be a complex task. The use of virtual environments is generally noted as being helpful since training on different road configurations and driving scenarios using real-world data can be difficult and/or dangerous, especially in the context of edge cases. However, generating the virtual environments can be time-consuming, costly, and can suffer from deficiencies in realism that can leave gaps within the virtual environments that extend into the trained systems.

Therefore, in at least one approach, an inventive system functions to synthesize virtual road segments as part of a virtual environment through the use of generative artificial intelligence and real sensor data. For example, many vehicles have various sensors that provide observations of the environment and/or responses of the vehicle to the environment. Of course, different vehicles may have different arrangements of sensors. That is, a vehicle that operates in a fully autonomous capacity may include a complex arrangement of sensors, such as cameras, LiDAR, radar, IMUs, etc. that provide a rich representation of the environment so that the vehicle can perform machine perception tasks in support of accurately navigating the environment. On the other hand, other vehicles may forgo the inclusion of more robust sensors, such as LiDAR, and instead include simple cameras, and other more common vehicle sensors, such as wheel sensors, road sensors, and so on. Accordingly, the information collected by a vehicle about the surrounding environment may vary depending on the configuration of the vehicle. Moreover, the vehicle generally collects telematics data that, in addition to including the sensor data about observations of the roadway and the surroundings, includes information about the functioning of the vehicle itself and the use of different systems within the vehicle. Thus, the sensor data collected from the vehicle may be varied and can include information about the environment and the vehicle.

Additionally, in further configurations, the system may also acquire at least a portion of the sensor data from secondary sources that are remote from the vehicle. For example, the system may query weather data services, mapping systems (e.g., orthographic image databases), and so on. In general, the sensor data embodies the associated segments of roadways at particular times as characterized by the time of day, the day of the year, the weather, and other ephemeral aspects of the environment that the vehicle is capturing. As such, each separate acquisition of the sensor data embodies a unique characterization of the roadway that may be summarized as having a particular "feel" to a driver/passenger. With this in mind, the inventive system can further process the sensor data about a given roadway segment to facilitate characterizing the segment for the specific acquisition. This may include generating various descriptive tags for the sensor data associated with the feel and/or semantics of the roadway and vehicle. This sensor data and associated information can then be stored as templates of information characterizing the different roadway segments.

In any case, the inventive system receives requests to generate a virtual road segment that involves, for example, stitching together separate segments of roadways into one where the segments are embodied in the sensor data. As one example, a roadway editor, which provides an interface to the sensor data, can accept inputs that select segments, modify segments, indicate characteristics that are to be applied to the segments when generating the virtual roadway, and so on. This may further include specifying elements not represented in the sensor data when, for example, the sensor data is missing information from certain sensors or a change to the underlying sensor data is desired in order to adapt data into a different representation. The roadway editor may take different forms but can include a visual-based editor (e.g., what you see is what you get (WYSIWYG) editor, etc.), a text-based editor, etc. Whichever approach is implemented, as noted, the roadway editor permits the selection of different segments of roadway from the sensor data as templates and/or a descriptive seed for generating a new segment, along with the ability to specify the parameters about the virtual road segment.

Accordingly, the inventive system, upon receiving the request, uses a generative model to synthesize the virtual road segment. The generative model is a machine learning algorithm that may be a transformer-based network, an autoencoder, or another model that generates content. Whichever form of model is implemented, the generative model accepts the sensor data for at least two separate segments along with the parameters describing how (e.g., desired characteristics or feel) to generate the virtual road segment. The generative model is then able to stitch together the separate road segments into one along with modifying different aspects of the road segments, such as the weather, road surface, surrounding environment, etc. to adapt a feel of the input segments into a unique output that is the virtual road segment.

In stitching together the separate road segments, the generative model may further generate a transition therebetween in order to form a seamless connection of the roadways into one. This can include applying characteristics of the existing segments to the transition and/or generating new characteristics as specified by the parameters. The inventive system may further analyze the virtual road segment to identify whether a form of the virtual road segment and associated environment is complete in that the segments connect in a realistic manner, and the feel (i.e., the characteristics of the road and environment) matches the parameters of the request. Otherwise, the system may iterate over the virtual road segment to improve the conformance with the request. Thereafter, the system can provide the virtual road segment in a universal format so that the virtual road segment can be utilized for various purposes. That is, in one or more arrangements, the system uses the virtual road segment to train a machine learning algorithm to perform machine perception, train a machine learning algorithm to perform automated driving functions, and/or generate a virtual driving environment for driver training/enjoyment. In this way, the system improves the generation of virtual road environments for training of different systems and/or drivers.

In one embodiment, a template system is disclosed. The template system includes one or more processors and a memory communicably coupled to the one or more processors. The memory stores instructions that, when executed by the one or more processors, cause the one or more processors to receive a request to generate a virtual road segment, the request including parameters specifying characteristics of how to generate the virtual road segment. The instructions include instructions to synthesize the virtual road segment according to the parameters using a generative model, including stitching at least two roadway segments together using sensor data from at least one roadway. The instructions include instructions to provide the virtual road segment.

In one embodiment, a non-transitory computer-readable medium including instructions that, when executed by one or more processors, cause the one or more processors to perform one or more functions is disclosed. The instructions include instructions to receive a request to generate a virtual road segment, the request including parameters specifying characteristics of how to generate the virtual road segment. The instructions include instructions to synthesize the virtual road segment according to the parameters using a generative model, including stitching at least two roadway segments together using sensor data from at least one roadway. The instructions include instructions to provide the virtual road segment.

In one embodiment, a method is disclosed. In one embodiment, the method includes receiving a request to generate a virtual road segment. The request including parameters specifying characteristics of how to generate the virtual road segment. The method includes synthesizing the virtual road segment according to the parameters using a generative model, including stitching at least two roadway segments together using sensor data from at least one roadway. The method includes providing the virtual road segment.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
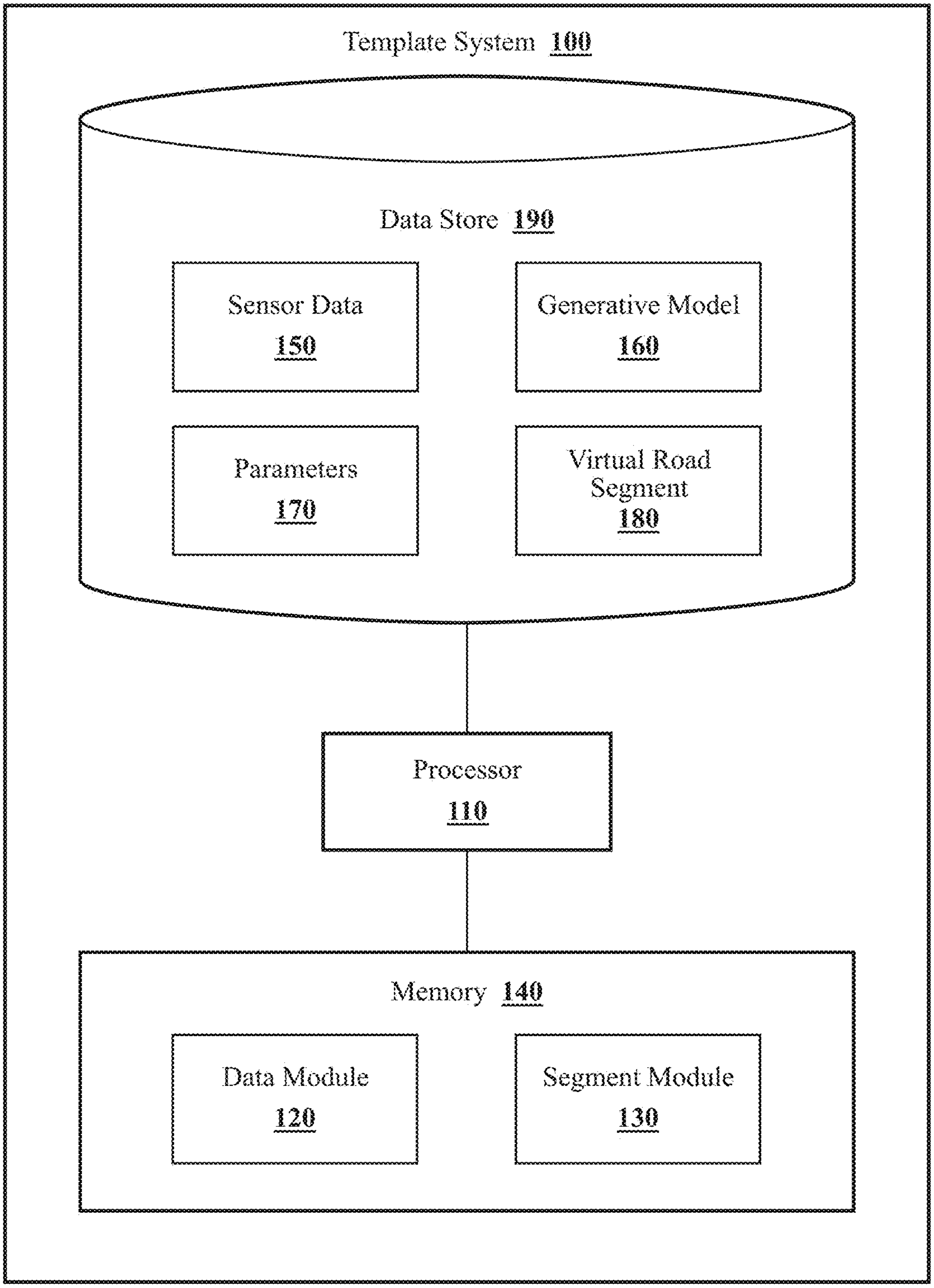
FIG. 1 illustrates one embodiment of a template system that is associated with using a generative model to create a virtual road segment from sensor data.

Systems, methods, and other embodiments associated with using sensor data of observed roadways as templates for generating virtual driving segments according to a generative model are disclosed. As previously noted, testing and training autonomous systems as well as drivers can be a complex task. The use of virtual environments is generally noted as being helpful since training on different road configurations and driving scenarios using real-world data can be difficult and/or dangerous, especially in the context of edge cases. However, generating the virtual environments can be time-consuming, costly, and can suffer from deficiencies in realism that can leave gaps within the virtual environments that extend into the trained systems.

Therefore, in at least one approach, an inventive system functions to synthesize virtual road segments as part of a virtual environment through the use of generative artificial intelligence and real sensor data. For example, many vehicles have various sensors that provide observations of the environment and/or responses of the vehicle to the environment. Of course, different vehicles may have different arrangements of sensors. That is, a vehicle that operates in a fully autonomous capacity may include a complex arrangement of sensors, such as cameras, LiDAR, radar, IMUs, etc. that provide a rich representation of the environment so that the vehicle can perform machine perception tasks in support of accurately navigating the environment. On the other hand, other vehicles may forgo the inclusion of more robust sensors, such as LiDAR, and instead include simple cameras, and other more common vehicle sensors, such as wheel sensors, road sensors, and so on. Accordingly, the information collected by a vehicle about the surrounding environment may vary depending on the configuration of the vehicle. Moreover, the vehicle generally collects telematics data that, in addition to including the sensor data about observations of the roadway and the surroundings, include information about the functioning of the vehicle itself and the use of different systems within the vehicle. Thus, the sensor data collected from the vehicle may be varied and can include information about the environment and the vehicle.

Additionally, in further configurations, the system may also acquire at least a portion of the sensor data from secondary sources that are remote from the vehicle. For example, the system may query weather data services, mapping systems (e.g., orthographic image databases), and so on. In general, the sensor data embodies the associated segments of roadways at particular times as characterized by the time of day, the day of the year, the weather, and other ephemeral aspects of the environment that the vehicle is capturing. As such, each separate acquisition of the sensor data embodies a unique characterization of the roadway that may be summarized as having a particular "feel" to a driver/passenger. With this in mind, the inventive system can further process the sensor data about a given roadway segment to facilitate characterizing the segment for the specific acquisition. This may include generating various descriptive tags for the sensor data associated with the feel and/or semantics of the roadway and vehicle. This sensor data and associated information can then be stored as templates of information characterizing the different roadway segments.

In any case, the inventive system receives requests to generate a virtual road segment that involves, for example, stitching together separate segments of roadways into one where the segments are embodied in the sensor data. As one example, a roadway editor, which provides an interface to the sensor data, can accept inputs that select segments, modify segments, indicate characteristics that are to be applied to the segments when generating the virtual roadway, and so on. The roadway editor may take different forms but can include a visual-based editor (e.g., what you see is what you get (WYSIWYG) editor, etc.), a text-based editor, etc. Whichever approach is implemented, as noted, the roadway editor permits the selection of different segments of roadway from the sensor data as templates and/or a descriptive seed for generating a new segment along with the ability to specify the parameters about the virtual road segment.

Accordingly, the inventive system, upon receiving the request, uses a generative model to synthesize the virtual road segment. The generative model is a machine learning algorithm that may be a transformer-based network, an autoencoder, or another model that generates content. Whichever form of model is implemented, the generative model accepts the sensor data for at least two separate segments along with the parameters describing how (e.g., desired characteristics or feel) to generate the virtual road segment. The generative model is then able to stitch together the separate road segments into one along with modifying different aspects of the road segments, such as the weather, road surface, surrounding environment, etc. to adapt a feel of the input segments into a unique output that is the virtual road segment.

In stitching together the separate road segments, the generative model may further generate a transition therebetween in order to form a seamless connection of the roadways into one. This can include applying characteristics of the existing segments to the transition and/or generating new characteristics as specified by the parameters. The inventive system may further analyze the virtual road segment to identify whether a form of the virtual road segment and associated environment is complete in that the segments connect in a realistic manner, and the feel (i.e., the characteristics of the road and environment) matches the parameters of the request. Otherwise, the system may iterate over the virtual road segment to improve the conformance with the request. Thereafter, the system can provide the virtual road segment in a universal format so that the virtual road segment can be utilized for various purposes. That is, in one or more arrangements, the system uses the virtual road segment to train a machine learning algorithm to perform machine perception, train a machine learning algorithm to perform automated driving functions, and/or generate a virtual driving environment for driver training/enjoyment. In this way, the system improves the generation of virtual road environments for the training of different systems and/or drivers.

With reference to FIG. 1, one embodiment of a template system 100 is further illustrated. The template system 100 is shown as including a processor 110, which may be from a vehicle 600 (e.g., processor 610) of FIG. 6 or may be associated with a separate computing device, such as a server, cloud-computing system, and so on. Accordingly, the processor 110 may be a part of the template system 100, the template system 100 may include a separate processor from the processor 610 of the vehicle 600, or the template system 100 may access the processor 110 through a data bus or another communication path.

In one embodiment, the template system 100 includes a memory 140 that stores a data module 120 and a segment module 130. The memory 140 is a random-access memory (RAM), read-only memory (ROM), a hard-disk drive, a flash memory, or another suitable memory for storing the modules 120 and 130. The modules 120 and 130 are, for example, computer-readable instructions that, when executed by the processor 110, cause the processor 110 to perform the various functions disclosed herein. In alternative arrangements, the modules 120 and 130 are independent elements from the memory 140 that are, for example, comprised of hardware elements (e.g., arrangements of logic gates). Thus, in at least one arrangement, the modules 120 and 130 are ASICs, hardware-based controllers, a composition of logic gates, or another hardware-based solution.

Figure 2:
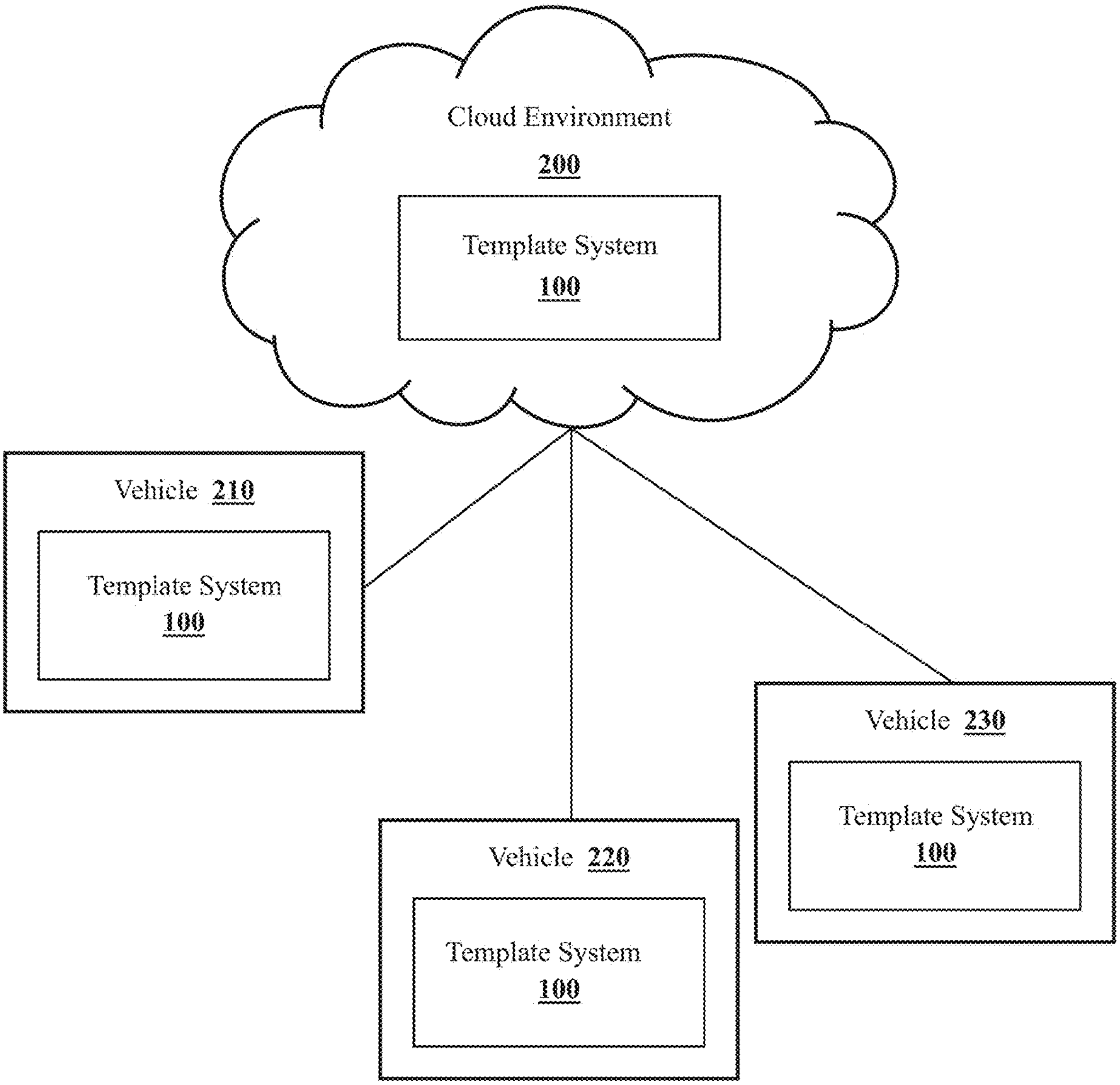
FIG. 2 illustrates one embodiment of the template system of FIG. 2 in a cloud-computing environment.

The template system 100, as illustrated in FIG. 1, is generally an abstracted form of the template system 100 as may be implemented between the vehicle 600 and/or a cloud-computing environment 200. FIG. 2 illustrates one example of a cloud-computing environment 200 that may be implemented along with the template system 100. As illustrated in FIG. 2, the template system 100 is embodied, at least in part, within the cloud-computing environment 200.

In one or more approaches, the cloud environment 200 may facilitate communications between multiple different vehicles to acquire and distribute information between vehicles 210, 220, and 230. That is, the separate vehicles 210, 220, and 230 may acquire the sensor data 150 of different road segments separately. Accordingly, as shown, the template system 100 may include separate instances within one or more entities of the cloud-based environment 200, such as servers, and also instances within vehicles that function cooperatively to acquire, analyze, and distribute the noted information. In a further aspect, the entities that implement the template system 100 within the cloud-based environment 200 may vary beyond transportation-related devices and encompass mobile devices (e.g., smartphones), and other devices that may benefit from the functionality or at least facilitate the functionality discussed herein. Thus, the set of entities that function in coordination with the cloud environment 200 may be varied.

In one approach, functionality associated with at least one module of the template system 100 is implemented within the vehicle 600, while further functionality is implemented within a cloud-based computing system. Thus, the template system 100 may include a local instance at the vehicle 600 (e.g., for data collection) and a remote instance that functions within the cloud-based environment.

Moreover, the template system 100, as provided for herein, may function in cooperation with a communication system. In one embodiment, the communication system communicates according to one or more communication standards. For example, the communication system can include multiple different antennas/transceivers and/or other hardware elements for communicating at different frequencies and according to respective protocols. The communication system, in one arrangement, communicates via a communication protocol, such as WiFi, DSRC, V2I, V2V, or another suitable protocol for communicating between the vehicle and other entities in the cloud environment. Moreover, the communication system, in one arrangement, further communicates according to a protocol, such as a global system for mobile communication (GSM), Enhanced Data Rates for GSM Evolution (EDGE), Long-Term Evolution (LTE), 5G, or another communication technology that provides for the vehicle communicating with various remote devices (e.g., a cloud-based server). In any case, the template system 100 can leverage various wireless communication technologies to provide communications to other entities, such as members of the cloud-computing environment when, for example, communicating the sensor data 150 or other data.

With continued reference to FIG. 1, in one embodiment, the template system 100 includes the data store 190. The data store 190 is, in one embodiment, an electronic data structure stored in the memory 140 or another data storage device that is configured with routines that can be executed by the processor 110 for analyzing stored data, providing stored data, organizing stored data, and so on. Thus, in one embodiment, the data store 190 stores data used by the modules 120 and 130 in executing various functions. In one embodiment, the data store 190 stores the sensor data 150, the generative model 160, the parameters 170, and the virtual road segment 180.

The data module 120 generally includes instructions that function to control the processor 110 to acquire data inputs that form the sensor data 150. The sensor data 150 can include, in various arrangements, observations of an environment from the perspective of a vehicle on a roadway. In further arrangements, the sensor data 150 can also include information from secondary sources, such as satellite imagery, weather data, and so on. In any case, the sensor data 150 collected directly by the vehicle is of a perspective from the vehicle traversing the roadway and using various sensors to perceive the roadway and surroundings.

As provided for herein, the data module 120, in one embodiment, acquires sensor data 150 that includes perceptions of the surroundings and perceptions about the vehicle itself. Thus, the sensor data 150 can include vehicle location, camera images, radar data, wheel sensor data, roadway data, IMU data, dynamics data, vehicle diagnostic information, and so on. In various arrangements, the data module 120 acquires the sensor data 150 from sensors, such as a radar 623, a LiDAR 624, and other sensors as may be suitable for identifying aspects of the roadway, the surrounding environment, and the functioning of the vehicle itself. Thus, the present examples are provided for purposes of discussion but are not intended to be limiting. That is, the variety and number of sensors used to collect the sensor data 150 may vary beyond what is described herein. Moreover, while raw sensor information is described, the data module 120 may further acquire processed data that forms derived observations of the surrounding environment, such as detections of lane markers, road boundaries, signs, traffic signals, and so on.

Accordingly, the data module 120, in one embodiment, controls the respective sensors to provide the data inputs in the form of the sensor data 150, which the data module 120 may process into refined determinations about what is depicted therein. Moreover, the data module 120 can undertake various approaches to fuse data from multiple sensors when providing the sensor data 150 and/or from sensor data acquired over a wireless communication link (e.g., v2v) from one or more of surrounding vehicles or other devices that generate observations of the environment. Thus, the sensor data 150, in one embodiment, represents a combination of perceptions acquired from multiple sensors and/or entities. Consequently, in combination with information from secondary sources (e.g., weather data, satellite imagery, terrain data, etc.), the sensor data 150 provides a rich representation of the observed roadways.

As a brief description of the data from secondary sources, in various arrangements, the data includes satellite data, such as orthographic images or other images that are generally overhead images of a roadway and aspects about the roadway, such as lane lines, and so on. The sensor data 150 may also include probe data of tracks traversed by other vehicles, including trajectory data at each separate point and map data of the particular location. Map data acquired from secondary sources can include information about the location, such as general attributes (e.g., speed limits, traffic data, etc.) along with information regarding points-of-interest (POIs) along the roadways. Thus, in addition to being collected by vehicles, the sensor data can include information collected by aerial imaging platforms (e.g., planes, satellites, drones, etc.) and also data from government databases, such as utility information, surveying information (e.g., road and lot boundaries), weather data, etc. In various arrangements, the sensor data 150 may be acquired from particular vehicles, separate remote devices, such as satellites, aerial imaging platforms, probe vehicles, and/or remote servers. For example, the data module 120 may communicate directly with the collection mechanisms or through a service that acquires the data and then routes the data to the data module 120, which is stored as the sensor data 150.

As noted, the sensor data 150 includes various modalities of information, such as imaging data, telematics data, etc. The imaging data can include data from the vehicle 600 and/or overhead images of a roadway that may span a defined region, such as a defined distance, a geopolitical area (e.g., a township, county, state, etc.), an area defined according to a format of the data itself, etc. The imaging data generally provides sufficient resolution to resolve features of the roadway, including lane markers. In further aspects, the imaging data includes, additionally or alternatively, radar imaging, LiDAR imaging, vehicle-mounted camera imaging, or another source of imaging data that provides information about the roadway.

The data module 120, in one configuration, includes instructions that cause the processor 110 to initially acquire the sensor data 150 and then, in at least one approach, process the sensor data 150 using the generative model 160 according to a request with defined parameters 170. By way of example, consider FIG. 3, which illustrates an example 300 of the generative model 160 processing a request 305. As shown, the request 305 includes the sensor data 150 along with parameters 170. It should be noted that the request 305 may take different forms depending on the particular instance. That is, the request 305, in one instance, can be provided with only the parameters 170. In this case, the parameters 170 define how the generative model 160 generates the virtual road segment 180 without using the sensor data 150. In any case, the generated virtual segment can then be used as part of a subsequent request that does include the sensor data 150. Accordingly, while the example 300 shows a particular form of the request 305, the request may be varied and can include a combination of the parameters 170, the sensor 150, and/or synthetic data.

In any case, the parameters 170 specify various characteristics about how the generative model 160 is to generate the virtual road segment 180. This can include simple aspects, such as how to generate a transition between two separate segments represented in the sensor data 150 and/or more complex characteristics, such as how to generate a "feel" of the virtual road segment 180, which may include a combination of different attributes. For example, the parameters 170 can specify how the roadway segments are to be joined, along with other characteristics, including elements of the sensor data 150 to modify, a feel of the virtual road segment 180, and an environment associated with the virtual road segment 180. As further explanation, the "feel" of the virtual road segment 180 or a segment embodied in the sensor data 150 refers to a combination of attributes that coalesce to provide an experience that is expressed as the "feel." By way of example, the feel can include qualitative descriptions of a road segment that are formed from the combination of quantitative attributes. The flow may refer how a roadway is flowy, curvy, undulating, mountainous, has loose gravel, is bumpy, etc. These descriptors, which are provided for purposes of explanation and do not constitute a comprehensive listing, correspond to a grouping of attributes with a distribution of possible values to provide the particular feel.

As one example, a flowy feel may correspond to a road having slight curves (e.g., 1-3 on a scale of 1-10) in combination with changes in elevation (e.g., 1-3 on a scale of 1-10) and a smooth road surface (e.g., 1-2 on a scale of 1-10). The noted scale quantifies each separate attribute with 1 equaling none or a slight occurrence of the attribute and 10 equaling a severe occurrence of the attribute. As another example, a mountainous roadway may correspond to curves of 4-5, elevation changes of 5 or more, and a road surface that is 4-10 in relation to gravel and/or dirt. In this way, the system can broadly characterize different segments of roadways according to attributes thereof while relating the attributes in a qualitative manner.

In order to form the request 305, inputs may be provided to a roadway editor that forms the request 305 or inputs may be provided via text defining each of the parameters 170 manually. The roadway editor may be a visual-based editor, such as a while WYSIWYG-style editor, that provides for direct interaction with the sensor data 150 to add, delete, and modify elements. For example, the roadway editor may include sliders or other interactive elements that permit that adjustment of different characteristics of the roadway segment as depicted in the sensor data 150 and/or the virtual road segment 180 once generated. For example, the roadway editor may permit the input of adjustments to the roadway surface (e.g., bumpiness, grip, surface type, temperature, etc.), the weather, the time of day, day of the year, traffic, roadway undulation, roadway curviness, roadway altitude, and so on. Similarly, the roadway editor may permit input of adjustments to the shape of the road, width, characteristics of the surrounding environment (e.g., biome, placement of elements, presence of elements, presentation style, etc.), and so on. In general, the parameters 170 may specify any aspect of the virtual road segment 180 that is to be generated.

Moreover, it should be appreciated that while real data and modifications (e.g., additions/deletions) of the real data are described, the request 305 may further focus on abstracted forms of the sensor data 150 and/or integration of wholly synthetic/abstract elements. That is, the requests 305 may diverge from including solely realistic data to include abstract representations, such as animations and/or abstracted renderings that are based on the underlying sensor data or that are detached from the underlying sensor data as, for example, a way of integrating additional variations with the virtual road segment 180. For example, the request 305 may indicate to add an animated element, such as an animal, person, structure, etc. as part of the virtual road segment 180. As a further example, the request 305 may specify to modify the appearance of the whole environment into a particular type of animation (e.g., gothic, looney, etc.). Thus, the request 305 can include variations beyond realistic modifications of the sensor data 150.

Of course, the roadway editor generally functions over the sensor data 150 such that the roadway editor accepts a selection of two or more segments of roadway as embodied in the sensor data 150 and permits editing of the sensor data 150 via the roadway editor. This can include further specifying how to transition between the segments (e.g., a shape of a transition road and other characteristics) along with specifying how to generate additional segments of roadway that may be used to link with the selected segments. The roadway editor then forms the request 305 according to the inputs by generating the parameters 170 and embedding the sensor data for the selected road segments.

Figure 3:
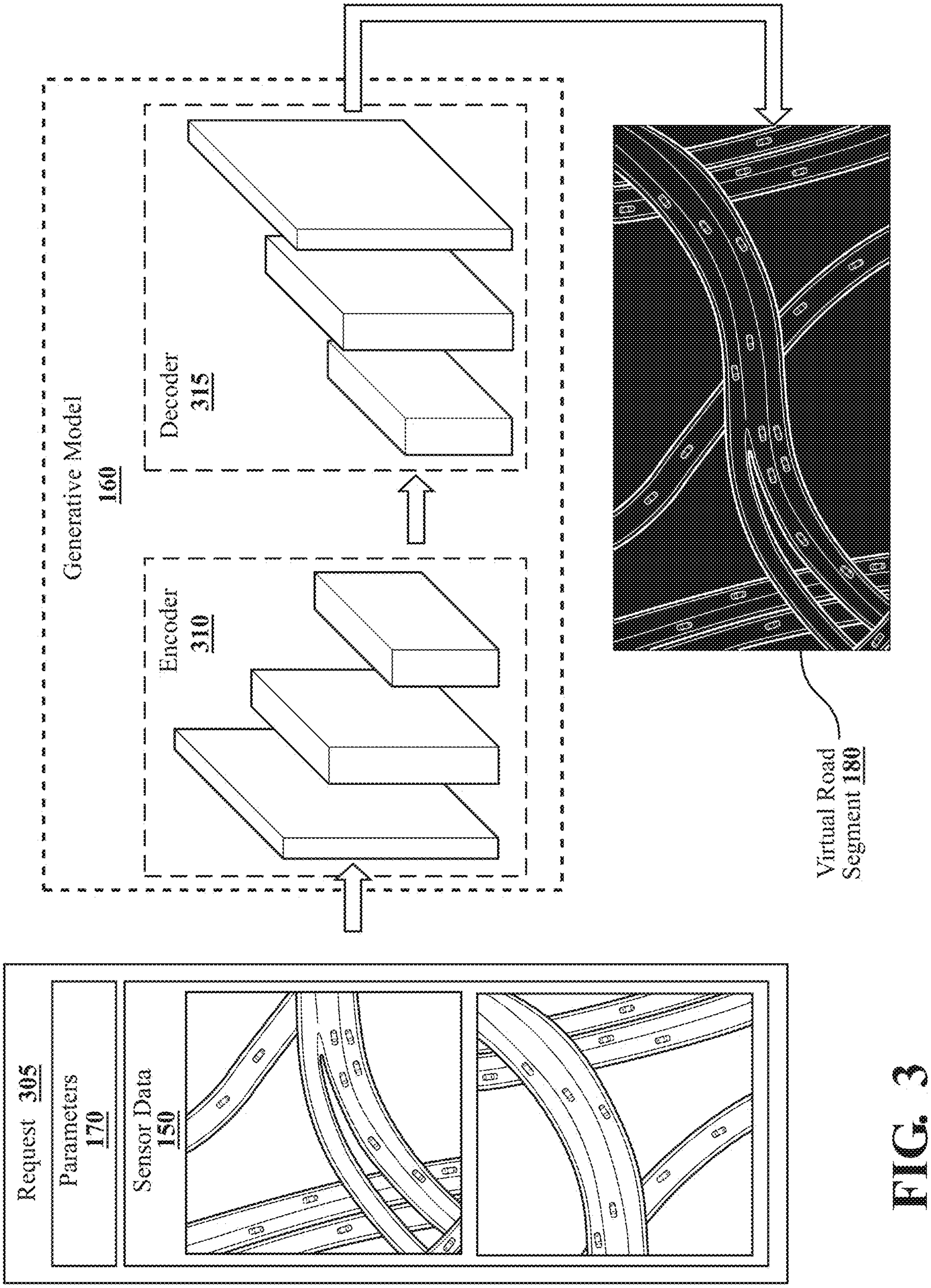
FIG. 3 illustrates one embodiment of a generative neural network and an associated request.

The segment module 130 includes instructions to control the generative model 160 to generate the virtual road segment 180 according to the request 305. The generative model 160 is, in at least one arrangement, a generative neural network having an encoder-decoder structure. One example of the generative model 160 is illustrated in FIG. 3. As illustrated, the architecture is an encoder/decoder architecture with an encoder 310 and a decoder 315. The configuration of the encoder 310, in one or more approaches, may include a series of layers that include, for example, convolutional layers, pooling layers, and so on. In general, the encoder 310 includes encoding layers arranged in a series that function to reduce spatial dimensions of the sensor data 150 into representations about embedded states of features included therein. The encoder 310, in at least one approach, encodes the sensor data 150 into a latent space that is represented using a feature vector with values for different aspects of the encoded information. The latent space is a spatial representation of possible features encoded by the encoder 310. By contrast, the decoder 315 is, for example, comprised of deconvolutional layers that function to generate, through inference, the output according to the features provided by the encoder 310. In further examples, the machine-learning architecture may be characterized as an autoencoder, a transformer, or another type of neural network that generally functions to generate an output in the form of the virtual road segment 180.

That is, the generative model 160 is, in at least one approach, a class of artificial neural networks designed to generate new data samples (e.g., a virtual road segment) that resemble a given dataset (e.g., the sensor data 150). In general, generative models focus on capturing the underlying distributions of the data to create new, similar data points in a manner that is controlled via the parameters 170 to vary the output in a desired manner. Moreover, the generative model 160 may provide the output (i.e., the virtual road segment 180) in a universal format that is ingestable by different application interfaces. Accordingly, in one approach, the output may be generated according to a markup language in a format that is descriptive of the virtual road segment and associated environment without providing a fully rendered environment. That is, the output is of a descriptive form that can then be used as an input to other applications such that the output is easily translated into formats usable by the other applications, which can include training machine learning algorithms for different tasks, generating virtual environments for drivers, and so on.

Figure 4:
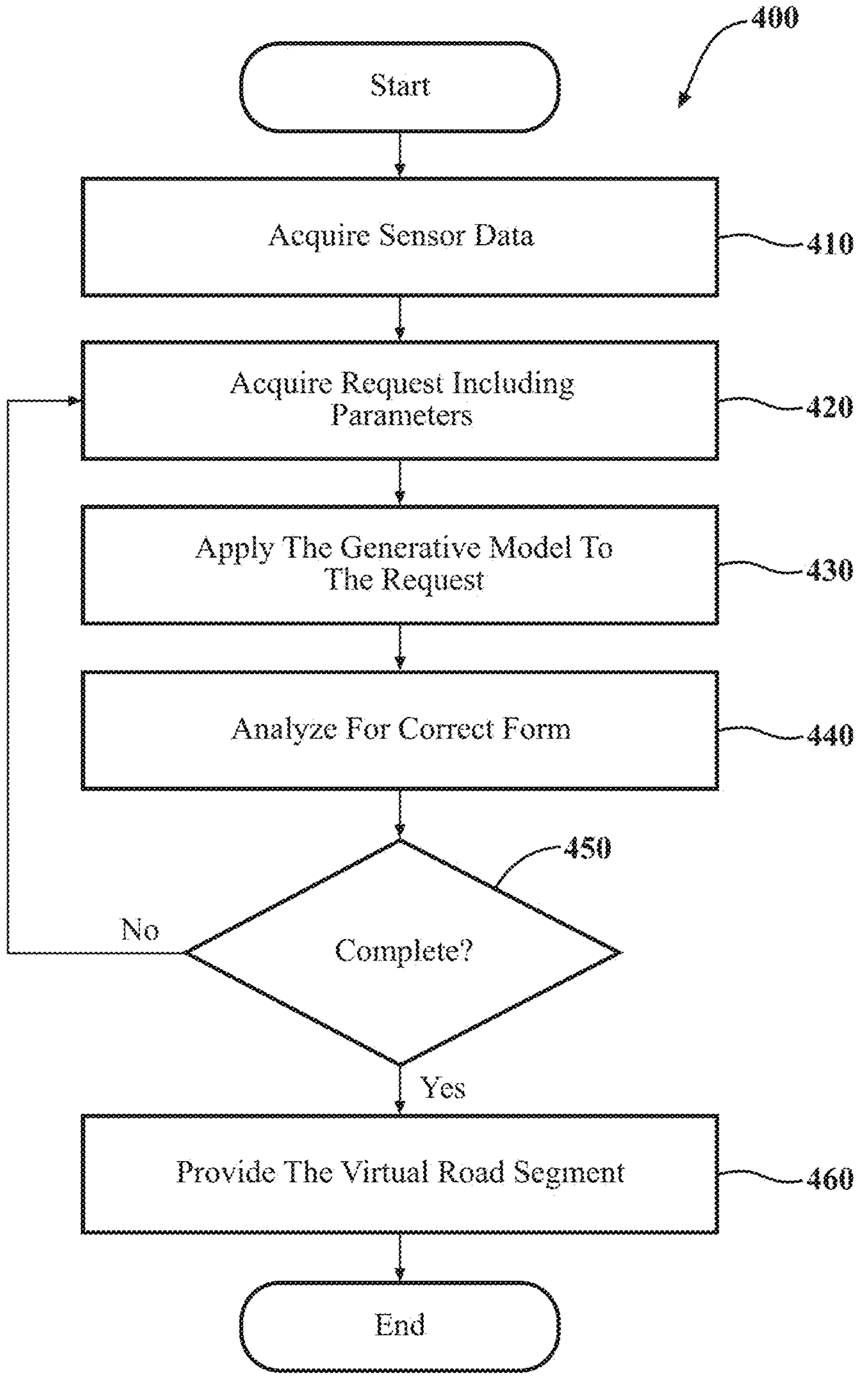
FIG. 4 illustrates a flowchart for one embodiment of a method associated with generating a virtual road segment.

Additional aspects of the template system 100 will be discussed in relation to FIG. 4. FIG. 4 illustrates a flowchart of a method 400 that is associated with generating virtual road segments from real sensor data. Method 400 will be discussed from the perspective of the template system 100 of FIG. 1. While method 400 is discussed in combination with the template system 100, it should be appreciated that the method 400 is not limited to being implemented within the template system 100 but is instead one example of a system that may implement the method 400.

At 410, the data module 120 acquires the sensor data 150 about one or more roadways. As previously described, the sensor data 150 may be comprised of various information depending on, for example, availability. For example, the data module 120 includes instructions that function to control the processor 110 to acquire sensor data in order to generate observations of roadway segments and surroundings. Broadly, an observation is information about a particular roadway segment derived from the sensor data of at least one sensor. Thus, the observation is generally a group of one or more data that may be processed into a meaningful form.

The data module 120 may acquire various electronic inputs that originate from the vehicle, which may be stored in a data store 190 of the template system 100. Accordingly, the data module 120, in one embodiment, controls respective sensors of the vehicle to provide the data inputs in the form of sensor data 150. The data module 120 may further process the sensor data 150 into separate observations of the surrounding environment. For example, the data module 120, in one approach, fuses data from separate sensors to provide an observation about a particular aspect of the surrounding environment. By way of example, the sensor data itself, in one or more approaches, may take the form of separate images, radar returns, LiDAR returns, telematics data (e.g., IMU data, road sensor data, wheel slip data, RPMs, dynamics, etc.), and so on. The data module 120 may derive determinations (e.g., speed, object ID, position, etc.) from the sensor data 150 and fuse the data for separate identified objects, such as a speed, time, and position for an observed vehicle, positions of lane lines, positions of static objects, etc. The data module 120 may further extrapolate the sensor data 150 into an observation by, for example, correlating the separate instances of the sensor data 150 into an observation beyond an instantaneous data point. For example, the data module 120 may track an object over many data points to provide a description about the behavior of the object through a field-of-view of the vehicle such that the observation characterizes the movement of the observed vehicle (e.g., vehicle A was moving at an average speed of 25 mph at time t across position p). As a further example, the data module 120 may derive locations of roadway features, conditions of the features as the vehicle encounters the features (e.g., icy lane during a snow storm), presence of pedestrians and associated paths/trajectories, a grip of the roadway, lighting conditions, time of day, wind, and so on.

Additionally, while the data module 120 is discussed as controlling the various sensors to provide the sensor data, in one or more embodiments, the module 120 can employ other techniques that are either active or passive to acquire the sensor data 150. For example, the data module 120 may passively sniff the sensor data from a stream of electronic information provided by the various sensors to a cloud-based entity or to further components within the vehicle. Moreover, as noted, the data module 120 can undertake various approaches to fuse data from multiple sensors when providing the sensor data 150. Thus, the sensor data 150, in one embodiment, represents a combination of perceptions acquired from multiple sensors.

Of course, depending on the sensors that the vehicle or other entity includes, the available sensor data that the template system 100 can harvest may vary. As one example, according to a particular implementation, a vehicle may include different versions of an IMU sensor that are separately capable of different measurements about the movement of the vehicle. That is, in one implementation, the IMU sensor may provide yaw rate, lateral acceleration, and longitudinal acceleration, whereas, in a separate implementation with a more robust IMU sensor, the IMU sensor may provide additional data such as pitch rates, roll rates, vertical acceleration, etc. As such, the data module 120 may, in one or more approaches, be configured to adapt to different electronic inputs depending on the availability of such information.

Moreover, the sensor data 150 can include entity-specific data (i.e., data about the vehicle, such as the IMU data, vehicle control inputs, ABS activation, traction control activation, stability control activation, etc.) and/or environment-specific data, such as images from a camera, radar data, LiDAR data, etc. Additionally, the data module 120 may also acquire the sensor data 150 from external sources, including other vehicles (e.g., via vehicle-to-vehicle communications), roadside units (e.g., via V2X communications), remote servers, and so on. In any case, the data module 120 acquires the sensor data 150 and generates the observations therefrom. In various approaches, the data module 120 may then communicate the observations 250 to the cloud-computing environment 300.

At 420, the segment module 130 receives a request to generate the virtual road segment 180. In one arrangement, the request includes the parameters 170 that specify characteristics of how to generate the virtual road segment 180. As previously noted, an editor may generate the request to include the parameters 170 and the parameters can vary widely depending on the particular request. For example, the parameters 170 can indicate the roadway segments from the sensor data 150 that are to be stitched together, how the roadway segments are to be joined/stitched (e.g., whether the model 160 is to generate a synthetic transition, smooth a transition directly between the segments, generate additional synthetic segments attached to the selected segments, etc.), explicit characteristics about the virtual road segment 180, etc. The characteristics can indicate many different aspects, including elements to modify (e.g., changes in style, form, placement, etc. to existing objects in the sensor data 150), aspects to add (e.g., objects to add to the virtual road segment that are not present in the sensor data 150), aspects to delete from the sensor data 150, a feel of the virtual road segment, an environment associated with the virtual road segment (e.g., a biome, a rendering/animation style, selection and placement of specific environmental aspects, such as mountains, rivers, etc., presence/location of traffic and pedestrians, etc.), and so on. In general, the request can specify any aspect of the road and associated environment to add, delete, and/or modify, which is then processed via the generative model 160 in one or more iterations to provide the segment 180.

At 430, the segment module 130 synthesizes the virtual road segment 180 according to the parameters 170 using the generative model 160. The generative model 160 functions to create new data based on patterns distributions learned from existing data. Thus, in the context of generating the virtual road segment 180, the generative model 160 seeks to form a new road segment from the sensor data 150 that is provided with the request and according to a manner described by the parameters 170. Thus, in at least one arrangement, the segment module 130 uses the generative model 160 to stitch together at least two roadway segments represented in the sensor data 150. The roadway segments are, in general, segments of roadway that are not joined together in reality as a consecutive sequence but are instead separated as distinct sections of roadway that were not previously together. As such, the generative model 160 functions to join the disparate segments, which generally includes generating a transition between the two roadway segments and adding, deleting, and modifying the sensor data 150 as otherwise prescribed.

A key aspect of the functionality associated with the generative model 160 is, in various arrangements, that the model 160 performs the noted functions (adding, deleting, modifying) according to learned patterns such that the transitions and other modifications match the desired "feel" or style of the virtual road segment 180. For example, the generative model 160 performs deletions within the sensor data 150 such that the remaining areas are adapted to have an expected form that fits with the virtual road segment 180 so as to not leave aberrations. Similarly, the generative model 160 forms the transitions such that the separate segments are joined together in a way that is seamless. That is, the roads and lanes align, and there are no aberrations or abrupt transitions of sidewalks or surfaces while the feel of the environment is adjusted according to the parameters 170. Accordingly, the generative model 160 modifies attributes of the sensor data 150 and creates an environment and characteristics of the environment according to the parameters 170. As previously noted, this can include adapting a biome (i.e., plants, landscapes, etc.) and/or adjusting a styling of the environment between realistic and animated/artistic such that the final virtual road segment 180 and associated surrounding environment match what is specified by the parameters 170. In this way, the generative model 160 uses the sensor data 150 as a template of a structure of the virtual road segment 180 while adapting aspects as needed.

At 440, the segment module 130 analyzes the virtual road segment 180 to identify whether a form of the virtual road segment 180 satisfies a completeness threshold. For example, in one or more approaches, the segment module 130 analyzes the virtual road segment 180 to determine whether the depicted roadway is of a closed form (i.e., a completely connected loop). This may include identifying missing elements (e.g., road signs, lane markers, etc.), branches of the segment that are dead ends, and other aberrations within the virtual road segment 180, including the environment around the segment that is generated as part of the virtual road segment 180 overall. In different implementations, the analysis of the virtual road segment may be undertaken in different ways. For example, the generative model 160 and/or a separate routine that parses the virtual road segment 180 may function to identify conformity with the completion threshold.

Beyond the aspects of abruptly ending roadways, missing traffic signs or other elements of a roadway, the segment module 130 can further analyze the virtual road segment 180 for compliance with the parameters 170. That is, the segment module 130 determines whether the virtual road segment 180 satisfies what has been provided in the request. Thus, when the request specifies changes in the styling of the virtual environment (e.g., animated), the generative model 160 adapts the environment and the segment module 130 then must check whether the generated style matches the request. In this way, the template system 100 is able to ensure that the virtual road segment 180 matches the request.

At 450, the segment module 130 determines whether or not the virtual road segment 180 is complete. In one or more arrangements, the segment module 130 uses a completeness threshold to determine whether the segment 180 is complete. The completeness threshold may be defined in different ways depending on the implementation. For example, the completeness threshold may define a percentage or number of elements that do not correlate with the parameters 170 that are acceptable (e.g., 2%). In further arrangements, the completeness threshold may indicate different conditions, such as a connected circuit that includes no dead-end transitions, a realistic transition between stitched segments, unused connectors have been removed, and so on. Thus, the process of generating the virtual road segment 180 may occur in an iterative fashion by re-ingesting a partially completed segment along with the request, including the parameters 170. This permits the generative model 160 to refine the virtual road segment 180 and correct any of the noted aberrations.

At 460, the segment module 130 provides the virtual road segment 180. In various arrangements, providing the segment 180 may include different functions. For example, providing the virtual road segment 180 may include training a machine learning algorithm to perform machine perception, training a machine learning algorithm to perform automated driving functions, generating a virtual driving environment using the virtual road segment 180, and so on. In the case of training the machine learning algorithms for different tasks, the virtual road segment 180 functions as a synthetic environment with intrinsically known ground-truth information. Thus, the algorithms can be fed sensor data as though a vehicle is proceeding along the segment 180. The segment module 130 can then deriving a loss according to the known ground-truth information about the segment 180 that is intrinsically included within the generated segment 180.

In further aspects, the virtual road segment 180 functions as the basis for an immersive environment in which a user can control a virtual vehicle (either via controls of a real vehicle, e.g., vehicle 600, or via explicit computer input devices) for purposes of training or entertainment. Accordingly, the template system 100 may provide the output in a universal descriptive language that is ingestible via an application program interface (API) to form a virtual environment that is usable for the various purposes. In this way, the template system 100 is able to improve the training of various algorithms and, thereby, vehicles in which they are implemented as well as improving driver training by providing a streamlined approach to generating realistic environments.

Figure 5A:
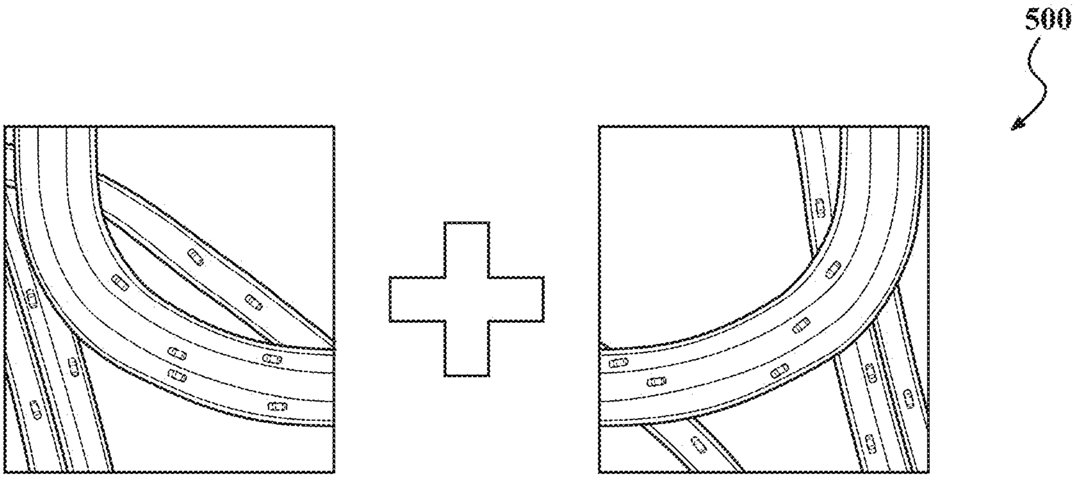
FIG. 5A-D illustrate one example of stitching two road segments together.
Figure 5B:
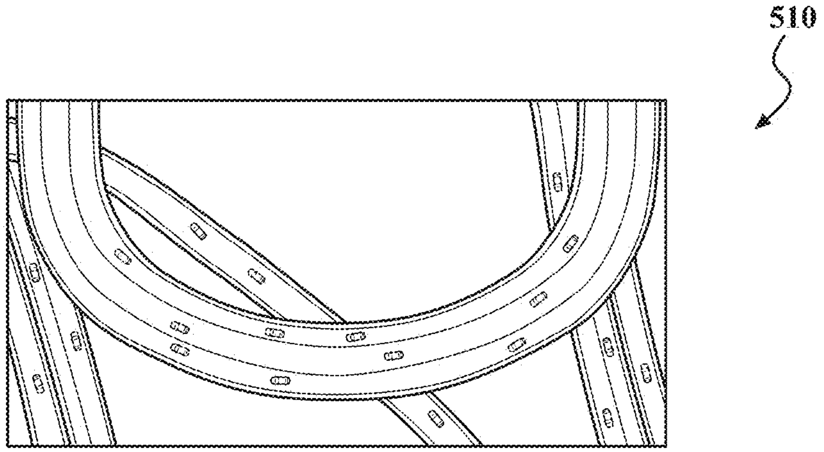

Continuing to FIG. 5A-D, one example of stitching together two road segments from sensor data and generating a virtual road segment is shown. In particular, FIG. 5A shows two segments 500 of sensor data depicting separate pieces of roadways. As noted previously, the sensor data 150 is captured by a vehicle traversing the road segments and generating observations of the contours, roughness of the road, lane lines, and the surrounding environment. Thus, the segments 500 can be of disparate pieces of roadways from different environments/biomes. In any case, FIG. 5B illustrates how the generative model 160 stitches the segments 500 together to form a stitched segment 510. Of course, in practice, the model 160 may not actually form the incremental segment but instead outputs a completed virtual road segment. However, in further aspects, the model 160 may iterate over incremental progressions in forming the final virtual road segment 180. In either case, the stitched segment 510 illustrates how the model 160 joins two disparate segments into a seamless section of roadway and forms a seamless transition therebetween in order to provide for creating a new segment from previously known segments.

Figure 5C:
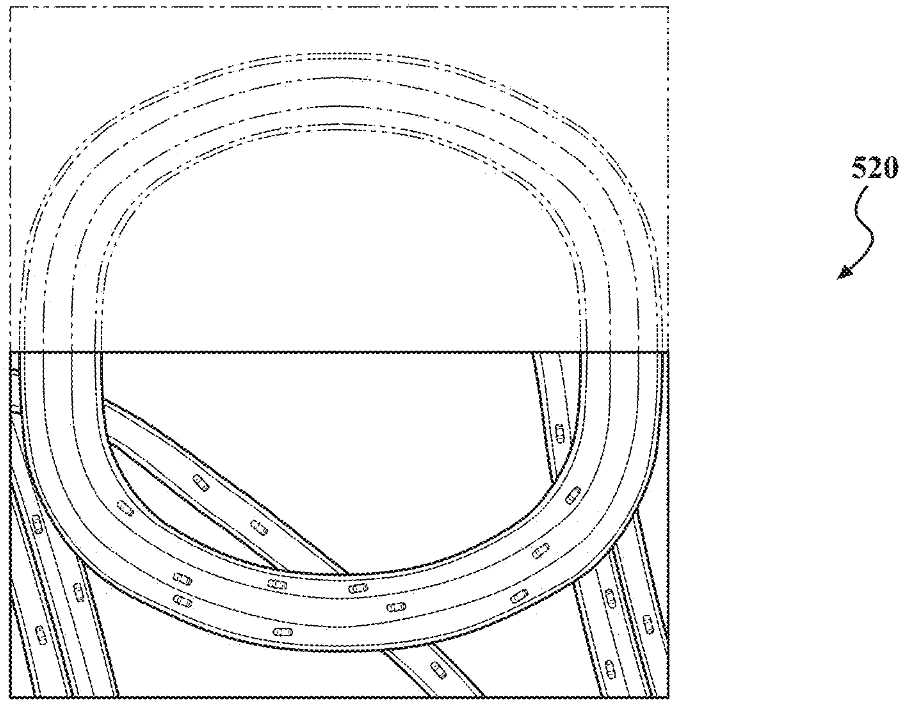

FIG. 5C illustrates a further synthesized segment 520 that the generative model 160 forms by adding an additional generated road segment. That is, the generative model 160, in one or more approaches, may wholly synthesize one or more portions of the virtual road segment 180 in order to form a complete circuit that is not open or otherwise ends abruptly. Accordingly, the generative model 160 can consider the characteristics of segments from the sensor data and/or attributes specified in the parameters 170 when creating the connecting section shown in FIG. 5C. Whichever considerations are undertaken, the generative model 160 can include synthetic sections of roadway that are not based on a specific template of another roadway but may be seeded according to the senor data or manually specified parameters.

Figure 5D:
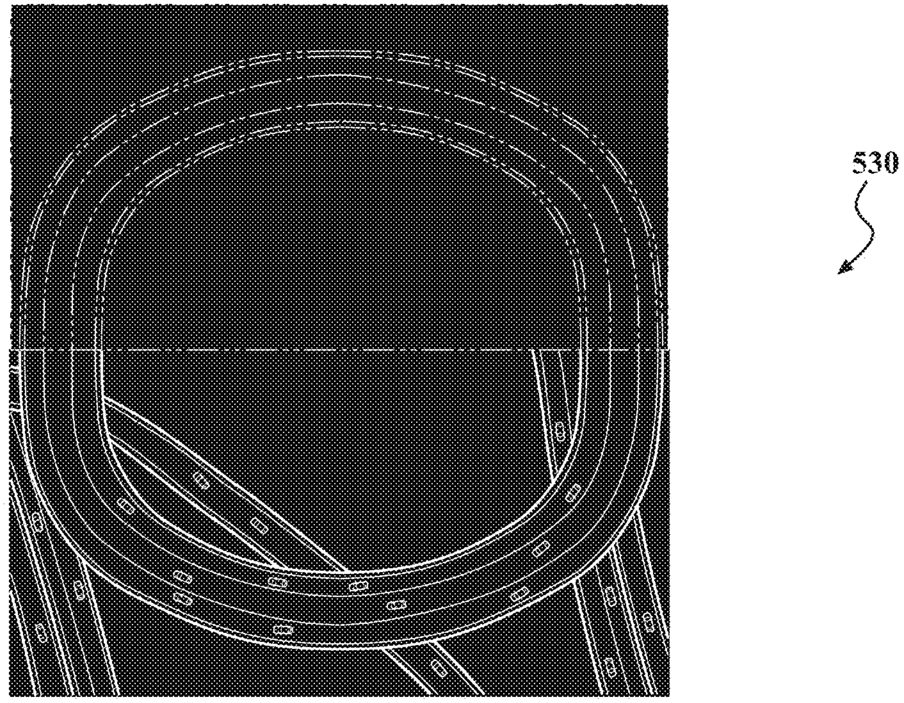

FIG. 5D illustrates a virtual road segment 530 that is completed. As shown, the coloring of the segment 530 is altered to represent additional modifications that the generative model 160 may undertake. As previously outlined, the generative model 160 can alter many existing aspects of the sensor data that is integrated as a template but may also depart from the existing aspects to add wholly new objects and other features and/or change the character of the environment depicted in the sensor data to be a different style (e.g., animated), biome, weather, time of day, and so on. In this way, the template system 100 is able to stitch together separate road segments and provide additional alterations to generate the virtual road segment 180.

Figure 6:
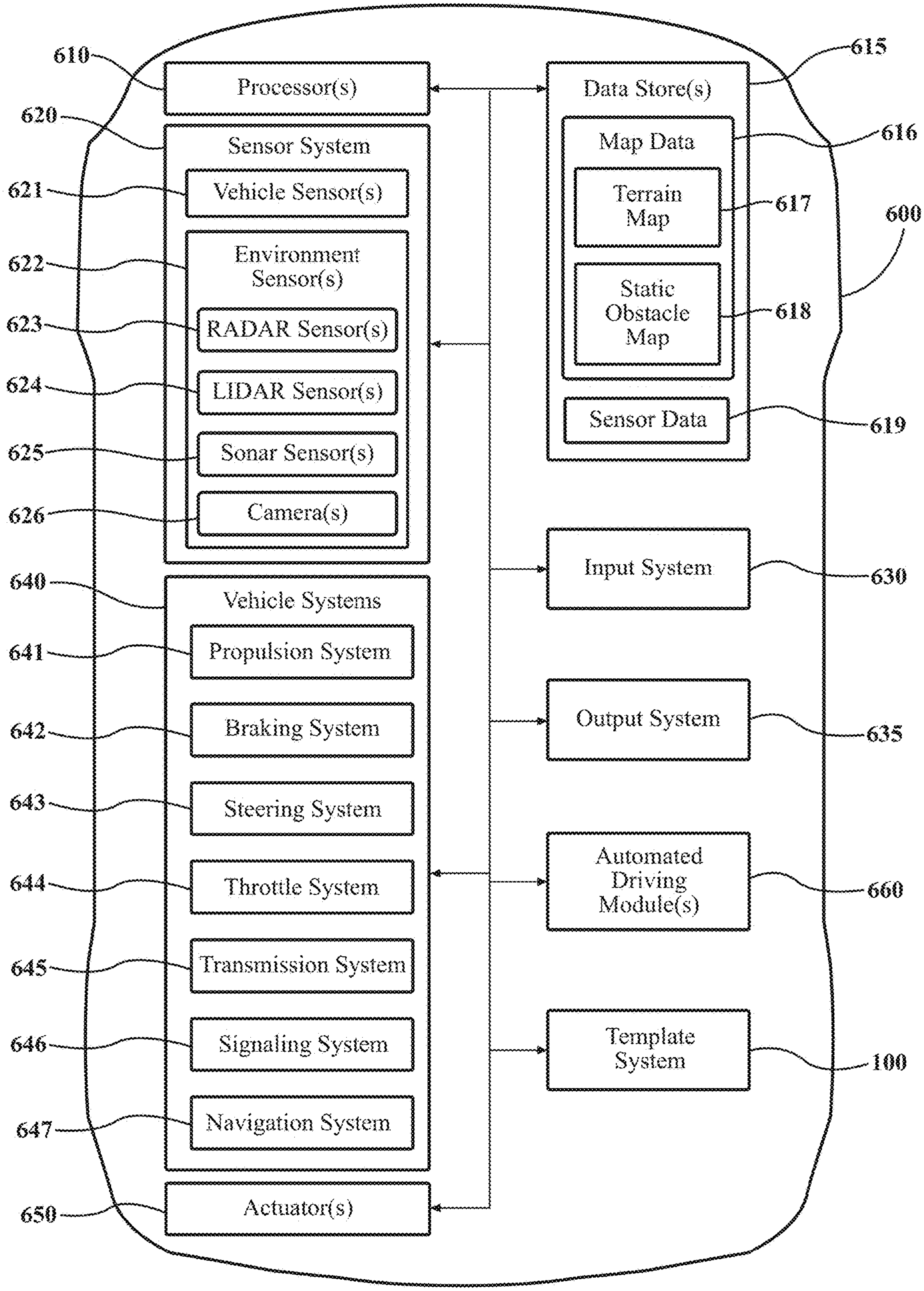
FIG. 6 illustrates one embodiment of a vehicle within which systems and methods disclosed herein may be implemented.

Referring to FIG. 6, an example of a vehicle 600 is illustrated. As used herein, a "vehicle" is any form of transport that may be motorized or otherwise powered. In one or more implementations, the vehicle 600 is an automobile. While arrangements will be described herein with respect to automobiles, it will be understood that embodiments are not limited to automobiles. In some implementations, the vehicle 600 may be a robotic device or a form of transport that, for example, includes sensors to perceive aspects of the surrounding environment, and thus benefits from the functionality discussed herein.

The vehicle 600 also includes various elements. It will be understood that in various embodiments it may not be necessary for the vehicle 600 to have all of the elements shown in FIG. 6. The vehicle 600 can have different combinations of the various elements shown in FIG. 6. Further, the vehicle 600 can have additional elements to those shown in FIG. 6. In some arrangements, the vehicle 600 may be implemented without one or more of the elements shown in FIG. 6. While the various elements are shown as being located within the vehicle 600 in FIG. 6, it will be understood that one or more of these elements can be located external to the vehicle 600. Further, the elements shown may be physically separated by large distances. For example, as discussed, one or more components of the disclosed system can be implemented within a vehicle while further components of the system are implemented within a cloud-computing environment or other system that is remote from the vehicle 600.

It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the vehicle 600 includes a template system 100 that is implemented to perform methods and other functions as disclosed herein relating to improving mapping through synthesizing probe data.

FIG. 6 will now be discussed in full detail as an example environment within which the system and methods disclosed herein may operate. In some instances, the vehicle 600 is configured to switch selectively between an autonomous mode, one or more semi-autonomous modes, and/or a manual mode. "Manual mode" means that all of or a majority of the control and/or maneuvering of the vehicle is performed according to inputs received via manual human-machine interfaces (HMIs) (e.g., steering wheel, accelerator pedal, brake pedal, etc.) of the vehicle 600 as manipulated by a user (e.g., human driver). In one or more arrangements, the vehicle 600 can be a manually-controlled vehicle that is configured to operate in only the manual mode.

In one or more arrangements, the vehicle 600 implements some level of automation in order to operate autonomously or semi-autonomously. As used herein, automated control of the vehicle 600 is defined along a spectrum according to the SAE J3016 standard. The SAE J3016 standard defines six levels of automation from level zero to five. In general, as described herein, semi-autonomous mode refers to levels zero to two, while autonomous mode refers to levels three to five. Thus, the autonomous mode generally involves control and/or maneuvering of the vehicle 600 along a travel route via a computing system to control the vehicle 600 with minimal or no input from a human driver. By contrast, the semi-autonomous mode, which may also be referred to as advanced driving assistance system (ADAS), provides a portion of the control and/or maneuvering of the vehicle via a computing system along a travel route with a vehicle operator (i.e., driver) providing at least a portion of the control and/or maneuvering of the vehicle 600.

With continued reference to the various components illustrated in FIG. 6, the vehicle 600 includes one or more processors 610. In one or more arrangements, the processor(s) 610 can be a primary/centralized processor of the vehicle 600 or may be representative of many distributed processing units. For instance, the processor(s) 610 can be an electronic control unit (ECU). Alternatively, or additionally, the processors include a central processing unit (CPU), a graphics processing unit (GPU), an ASIC, an microcontroller, a system on a chip (SoC), and/or other electronic processing units that support operation of the vehicle 600.

The vehicle 600 can include one or more data stores 615 for storing one or more types of data. The data store 615 can be comprised of volatile and/or non-volatile memory. Examples of memory that may form the data store 615 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 615 is a component of the processor (s) 610. In general, the data store 615 is operatively connected to the processor(s) 610 for use thereby. The term "operatively connected," as used throughout this description, can include direct or indirect connections, including connections without direct physical contact.

In one or more arrangements, the one or more data stores 615 include various data elements to support functions of the vehicle 600, such as semi-autonomous and/or autonomous functions. Thus, the data store 615 may store map data 616 and/or sensor data 619. The map data 616 includes, in at least one approach, maps of one or more geographic areas. In some instances, the map data 616 can include information about roads (e.g., lane and/or road maps), traffic control devices, road markings, structures, features, and/or landmarks in the one or more geographic areas. The map data 616 may be characterized, in at least one approach, as a high-definition (HD) map that provides information for autonomous and/or semi-autonomous functions.

In one or more arrangements, the map data 616 can include one or more terrain maps 617. The terrain map(s) 617 can include information about the ground, terrain, roads, surfaces, and/or other features of one or more geographic areas. The terrain map(s) 617 can include elevation data in the one or more geographic areas. In one or more arrangements, the map data 616 includes one or more static obstacle maps 618. The static obstacle map(s) 618 can include information about one or more static obstacles located within one or more geographic areas. A "static obstacle" is a physical object whose position and general attributes do not substantially change over a period of time. Examples of static obstacles include trees, buildings, curbs, fences, and so on.

The sensor data 619 is data provided from one or more sensors of the sensor system 620. Thus, the sensor data 619 may include observations of a surrounding environment of the vehicle 600 and/or information about the vehicle 600 itself. In some instances, one or more data stores 615 located onboard the vehicle 600 store at least a portion of the map data 616 and/or the sensor data 619. Alternatively, or in addition, at least a portion of the map data 616 and/or the sensor data 619 can be located in one or more data stores 615 that are located remotely from the vehicle 600.

As noted above, the vehicle 600 can include the sensor system 620. The sensor system 620 can include one or more sensors. As described herein, "sensor" means an electronic and/or mechanical device that generates an output (e.g., an electric signal) responsive to a physical phenomenon, such as electromagnetic radiation (EMR), sound, etc. The sensor system 620 and/or the one or more sensors can be operatively connected to the processor(s) 610, the data store(s) 615, and/or another element of the vehicle 600.

Various examples of different types of sensors will be described herein. However, it will be understood that the embodiments are not limited to the particular sensors described. In various configurations, the sensor system 620 includes one or more vehicle sensors 621 and/or one or more environment sensors. The vehicle sensor(s) 621 function to sense information about the vehicle 600 itself. In one or more arrangements, the vehicle sensor(s) 621 include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle 600.

As noted, the sensor system 620 can include one or more environment sensors 622 that sense a surrounding environment (e.g., external) of the vehicle 600 and/or, in at least one arrangement, an environment of a passenger cabin of the vehicle 600. For example, the one or more environment sensors 622 sense objects the surrounding environment of the vehicle 600. Such obstacles may be stationary objects and/or dynamic objects. Various examples of sensors of the sensor system 620 will be described herein. The example sensors may be part of the one or more environment sensors 622 and/or the one or more vehicle sensors 621. However, it will be understood that the embodiments are not limited to the particular sensors described. As an example, in one or more arrangements, the sensor system 620 includes one or more radar sensors 623, one or more LIDAR sensors 624, one or more sonar sensors 625 (e.g., ultrasonic sensors), and/or one or more cameras 626 (e.g., monocular, stereoscopic, RGB, infrared, etc.).

Continuing with the discussion of elements from FIG. 6, the vehicle 600 can include an input system 630. The input system 630 generally encompasses one or more devices that enable the acquisition of information by a machine from an outside source, such as an operator. The input system 630 can receive an input from a vehicle passenger (e.g., a driver/operator and/or a passenger). Additionally, in at least one configuration, the vehicle 600 includes an output system 635. The output system 635 includes, for example, one or more devices that enable information/data to be provided to external targets (e.g., a person, a vehicle passenger, another vehicle, another electronic device, etc.).

Furthermore, the vehicle 600 includes, in various arrangements, one or more vehicle systems 640. Various examples of the one or more vehicle systems 640 are shown in FIG. 6. However, the vehicle 600 can include a different arrangement of vehicle systems. It should be appreciated that although particular vehicle systems are separately defined, each or any of the systems or portions thereof may be otherwise combined or segregated via hardware and/or software within the vehicle 600. As illustrated, the vehicle 600 includes a propulsion system 641, a braking system 642, a steering system 643, a throttle system 644, a transmission system 645, a signaling system 646, and a navigation system 647.

The navigation system 647 can include one or more devices, applications, and/or combinations thereof to determine the geographic location of the vehicle 600 and/or to determine a travel route for the vehicle 600. The navigation system 647 can include one or more mapping applications to determine a travel route for the vehicle 600 according to, for example, the map data 616. The navigation system 647 may include or at least provide connection to a global positioning system, a local positioning system or a geolocation system.

In one or more configurations, the vehicle systems 640 function cooperatively with other components of the vehicle 600. For example, the processor(s) 610, the template system 100, and/or automated driving module(s) 660 can be operatively connected to communicate with the various vehicle systems 640 and/or individual components thereof. For example, the processor(s) 610 and/or the automated driving module(s) 660 can be in communication to send and/or receive information from the various vehicle systems 640 to control the navigation and/or maneuvering of the vehicle 600. The processor(s) 610, the template system 100, and/or the automated driving module(s) 660 may control some or all of these vehicle systems 640.

For example, when operating in the autonomous mode, the processor(s) 610, the template system 100, and/or the automated driving module(s) 660 control the heading and speed of the vehicle 600. The processor(s) 610, the template system 100, and/or the automated driving module(s) 660 cause the vehicle 600 to accelerate (e.g., by increasing the supply of energy/fuel provided to a motor), decelerate (e.g., by applying brakes), and/or change direction (e.g., by steering the front two wheels). As used herein, "cause" or "causing" means to make, force, compel, direct, command, instruct, and/or enable an event or action to occur either in a direct or indirect manner.

As shown, the vehicle 600 includes one or more actuators 650 in at least one configuration. The actuators 650 are, for example, elements operable to move and/or control a mechanism, such as one or more of the vehicle systems 640 or components thereof responsive to electronic signals or other inputs from the processor(s) 610 and/or the automated driving module(s) 660. The one or more actuators 650 may include motors, pneumatic actuators, hydraulic pistons, relays, solenoids, piezoelectric actuators, and/or another form of actuator that generates the desired control.

As described previously, the vehicle 600 can include one or more modules, at least some of which are described herein. In at least one arrangement, the modules are implemented as non-transitory computer-readable instructions that, when executed by the processor 610, implement one or more of the various functions described herein. In various arrangements, one or more of the modules are a component of the processor(s) 610, or one or more of the modules are executed on and/or distributed among other processing systems to which the processor(s) 610 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an application-specific integrated circuit (ASIC), programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

Furthermore, the vehicle 600 may include one or more automated driving modules 660. The automated driving module(s) 660, in at least one approach, receive data from the sensor system 620 and/or other systems associated with the vehicle 600. In one or more arrangements, the automated driving module(s) 660 use such data to perceive a surrounding environment of the vehicle. The automated driving module(s) 660 determine a position of the vehicle 600 in the surrounding environment and map aspects of the surrounding environment. For example, the automated driving module(s) 660 determines the location of obstacles or other environmental features including traffic signs, trees, shrubs, neighboring vehicles, pedestrians, etc.

The automated driving module(s) 660 either independently or in combination with the template system 100 can be configured to determine travel path(s), current autonomous driving maneuvers for the vehicle 600, future autonomous driving maneuvers and/or modifications to current autonomous driving maneuvers based on data acquired by the sensor system 620 and/or another source. In general, the automated driving module(s) 660 functions to, for example, implement different levels of automation, including advanced driving assistance (ADAS) functions, semi-autonomous functions, and fully autonomous functions, as previously described.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. The phrase "computer-readable storage medium" means a non-transitory storage medium. A computer-readable storage medium may be, for example, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system or device.

Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A template system, comprising:

one or more processors;

a memory communicably coupled to the one or more processors and storing instructions that, when executed by the one or more processors, cause the one or more processors to:

receive a request to generate a virtual road segment, the request including parameters specifying characteristics of how to generate the virtual road segment;

synthesize the virtual road segment according to the parameters using a generative model, including instructions to stitch at least two roadway segments together using sensor data from at least one roadway by using the generative model to generate a transition between the two roadway segments and analyzing the virtual road segment to identify whether a form of the virtual road segment satisfies a completeness threshold; and provide the virtual road segment.

2. The template system of claim 1, wherein the instructions further include instructions to acquire the sensor data about the at least one roadway from at least one vehicle that traverses the at least one roadway, wherein the sensor data includes information from sensors of the at least one vehicle, and wherein the instructions to acquire the sensor data further include instructions to query one or more secondary sources that are remote from the at least one vehicle about an area of the at least one roadway during a defined time.

3. The template system of claim 1, wherein the instructions to receive the request include instructions to acquire the parameters from a roadway editor that forms the request according to inputs that include selecting the roadway segments from the sensor data, specifying how the roadway segments are to be joined, and specifying the characteristics, the characteristics indicating one or more of: elements to modify, a feel of the virtual road segment, and an environment associated with the virtual road segment.

4. The template system of claim 1, wherein the instructions to synthesize the virtual road segment according to the parameters include instructions to modify attributes of the two road segments as included within associated sensor data while generating additional elements to satisfy the parameters of the request.

5. The template system of claim 4, wherein the instructions to synthesize the virtual road segment include instructions to use the generative model to create an environment and characteristics of the environment according to the parameters while using the sensor data as a template of a structure of the virtual road segment.

6. The template system of claim 1, wherein the instructions to provide the virtual road segment include instructions to perform at least one of: training a machine learning algorithm to perform machine perception according to the virtual road segment, training a machine learning algorithm to perform automated driving functions according to the virtual road segment, and generating a virtual driving environment using the virtual road segment.

7. The template system of claim 6, wherein the instructions to provide the virtual road segment include instructions to output the virtual road segment in a universal descriptive language that is ingestible via an application program interface (API) to form a virtual environment.

8. A non-transitory computer-readable medium including instructions that, when executed by one or more processors, cause the one or more processors to:

receive a request to generate a virtual road segment, the request including parameters specifying characteristics of how to generate the virtual road segment;

synthesize the virtual road segment according to the parameters using a generative model, including stitching at least two roadway segments together using sensor data from at least one roadway by using the generative model to generate a transition between the two roadway segments and analyzing the virtual road segment to identify whether a form of the virtual road segment satisfies a completeness threshold; and provide the virtual road segment.

9. The non-transitory computer-readable medium of claim 8, wherein the instructions further include instructions to acquire the sensor data about the at least one roadway from at least one vehicle that traverses the at least one roadway, wherein the sensor data includes information from sensors of the at least one vehicle, and wherein the instructions to acquire the sensor data further include instructions to query one or more secondary sources that are remote from the at least one vehicle about an area of the at least one roadway during a defined time.

10. The non-transitory computer-readable medium of claim 8, wherein the instructions to receive the request include instructions to acquire the parameters from a roadway editor that forms the request according to inputs that include selecting the roadway segments from the sensor data, specifying how the roadway segments are to be joined, and specifying the characteristics, the characteristics indicating one or more of: elements to modify, a feel of the virtual road segment, and an environment associated with the virtual road segment.

11. The non-transitory computer-readable medium of claim 8, wherein the instructions to synthesize the virtual road segment according to the parameters include instructions to modify attributes of the two road segments as included within associated sensor data while generating additional elements to satisfy the parameters of the request.

12. A method, comprising:

receiving a request to generate a virtual road segment, the request including parameters specifying characteristics of how to generate the virtual road segment;

synthesizing the virtual road segment according to the parameters using a generative model, including stitching at least two roadway segments together using sensor data from at least one roadway by using the generative model to generate a transition between the two roadway segments and analyzing the virtual road segment to identify whether a form of the virtual road segment satisfies a completeness threshold; and providing the virtual road segment.

13. The method of claim 12, further comprising:

acquiring the sensor data about the at least one roadway from at least one vehicle that traverses the at least one roadway, wherein the sensor data includes information from sensors of the at least one vehicle, and wherein acquiring the sensor data further includes querying one or more secondary sources that are remote from the at least one vehicle about an area of the at least one roadway during a defined time.

14. The method of claim 12, wherein receiving the request includes acquiring the parameters from a roadway editor that forms the request according to inputs that include selecting the roadway segments from the sensor data, specifying how the roadway segments are to be joined, and specifying the characteristics, the characteristics indicating one or more of: elements to modify, a feel of the virtual road segment, and an environment associated with the virtual road segment.

15. The method of claim 12, wherein synthesizing the virtual road segment according to the parameters includes modifying attributes of the two road segments as included within associated sensor data while generating additional elements to satisfy the parameters of the request.

16. The method of claim 12, wherein synthesizing the virtual road segment includes using the generative model to create an environment and characteristics of the environment according to the parameters while using the sensor data as a template of a structure of the virtual road segment.

17. The method of claim 12, wherein providing the virtual road segment includes at least one of: training a machine learning algorithm to perform machine perception according to the virtual road segment, training a machine learning algorithm to perform automated driving functions according to the virtual road segment, and generating a virtual driving environment using the virtual road segment, and wherein providing the virtual road segment includes outputting the virtual road segment in a universal descriptive language that is ingestible via an application program interface (API) to form a virtual environment.

* * * * *